Patented June 27, 1939

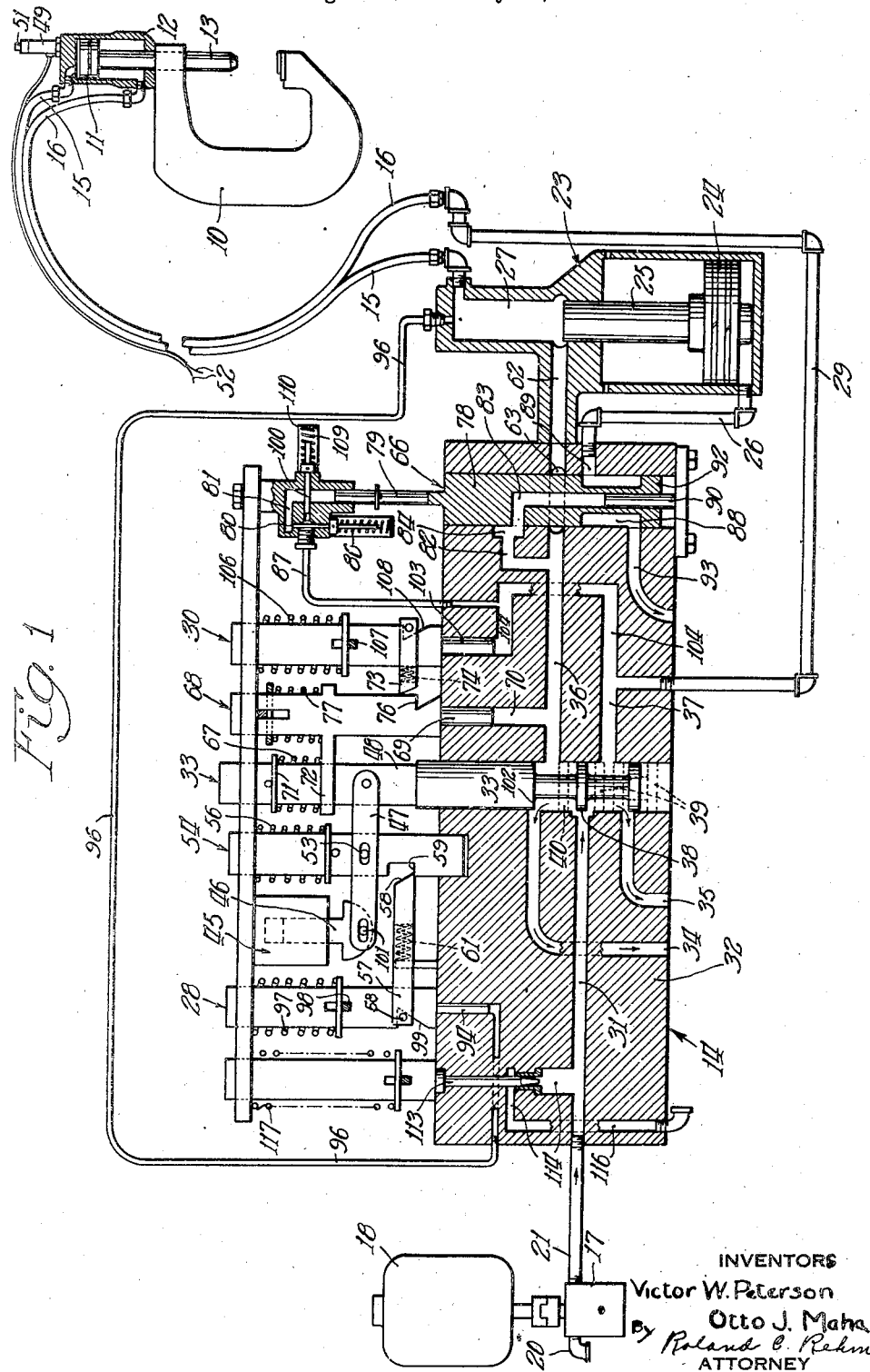

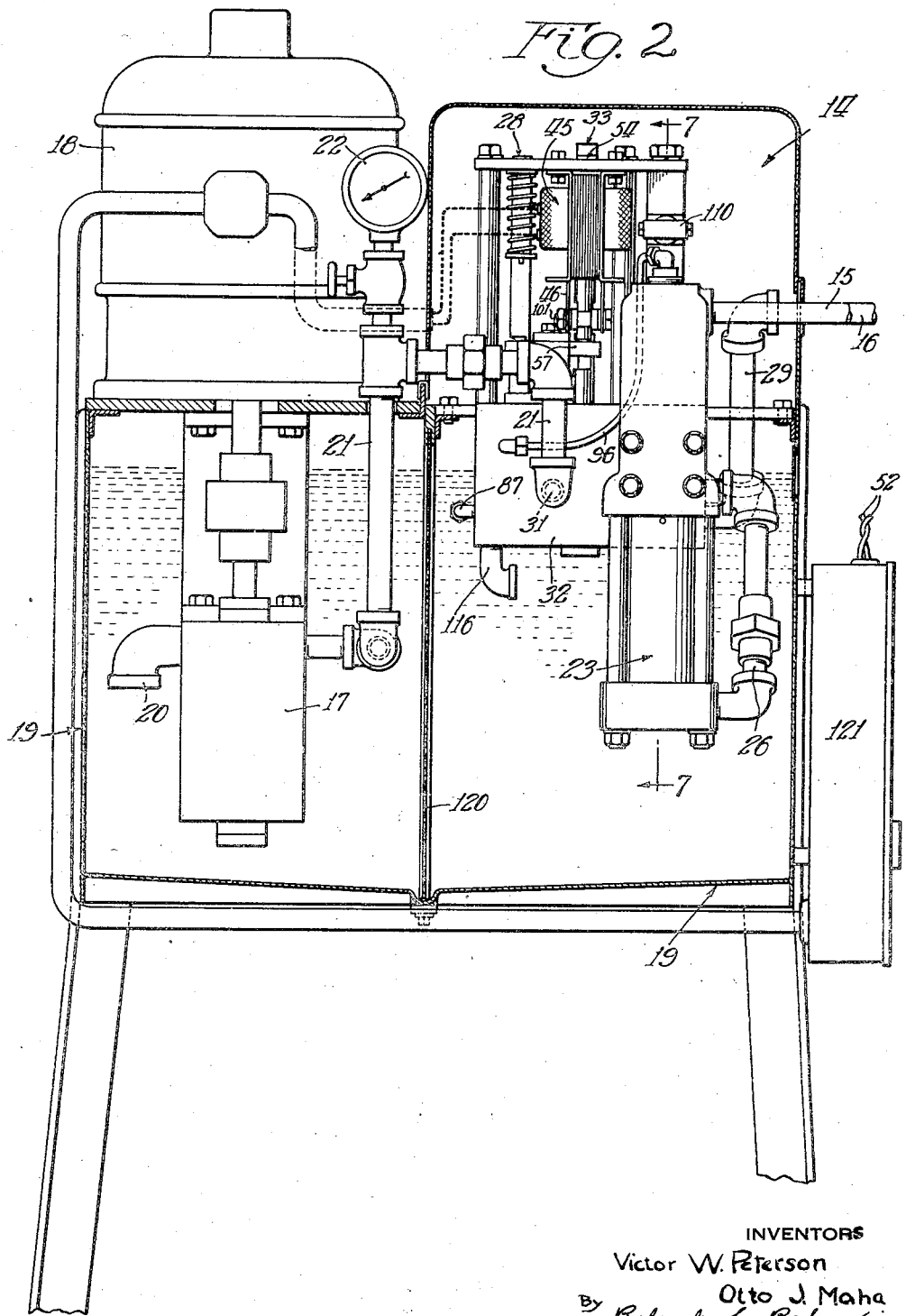

2,163,627

UNITED STATES PATENT OFFICE 2,163,627

PRESS AND THE LIKE

Victor W. Peterson and Otto J. Maha, Chicago, Ill., assignors to Hannifin Manufacturing Co., Chicago, Ill., a corporation of Illinois Original application July 20, 1936, Serial No. 91,630. Divided and this application October 4, 1938, Serial No. 233,284. In Canada December 1, 1937

3 Claims. (Cl. 77—42)

This invention relates to riveting and similar presses and, among other objects, aims to provide a small, easily and quickly maneuvered press capable of exerting pressures high enough to cold head rivets or perform other operations, such as punching, requiring high operating forces.

The nature of the invention may be readily understood by reference to one illustrative press embodying the invention and shown in the accompanying drawings.

In said drawings:

Fig. 1 is diagrammatic view illustrating a small riveting yoke adapted to cold head rivets and connected by flexible lines to a power unit; and Fig. 2 is a sectional elevation of the power unit.

Heretofore high operating forces for cold heading rivets, punching and the like have been available only in large and slow stationary presses. Presses of this character obviously could not be moved from place to place on the work but required that the work itself be shifted in the press—a slow operation except for the lightest pieces. Moreover such presses could reach only the most accessible places on the work. For riveting operations, despite the objections to hot heading of rivets, it has been the practice, therefore, to employ hot rivets which could be set either by a pneumatic hammer or a small press since the forces required for hot riveting are not high.

The invention is here shown embodied in a lightweight and small riveting yoke designed to cold head steel rivets as large as ⅜" and ½". To render it mobile and easily maneuvered from place to place on the work, the press is connected to the power apparatus by flexible hose lines of such character as to transmit, without undue stretching, the high pressures necessary to perform the work.

The riveting yoke comprises a small, lightweight C press yoke 10 made of heat treated alloy steel having the strength of about 200,000 pounds per square inch and capable of withstanding working stresses up to 175,000 pounds per square inch. For heading a ⅜" cold rivet where the maximum heading pressure exerted by the riveter is about 35,000 pounds, the use of steel of this character makes it possible to make a yoke riveter which, with the piston 11, the riveting tool and cylinder 12, weighs only about fifty pounds and which may, therefore, be maneuvered quickly and easily into engagement with successive rivets. Because of its small size, such a riveter is capable of reaching difficultly accessible rivets which cannot ordinarily be subjected to cold heading.

The riveting tool 13 or other press plunger is advanced and retracted by fluid under pressure delivered alternately to opposite faces of piston 11 in the work cylinder 12. To secure rapid advance of the tool or plunger into operative engagement with the work, fluid is supplied to the head end of the cylinder in large volumes at relatively low pressures up to approximately one thousand pounds per square inch. These are sufficient to close the tool quickly on the work, and, in the case of a rivet, undoubtedly will commence the heading of the rivet. Thereafter the power apparatus is designed to supply intensified pressures, e. g. up to about five thousand pounds per square inch to complete the heading of the rivet or other pressing or punching operation. The apparatus is, however, advantageous even where the final pressures required are as low as 2000 to 2500 pounds per square inch. Upon completion of the operation, fluid is supplied to the opposite face of the piston 11 to provide a relatively rapid return.

The foregoing sequence of operations, including the supply of intensified pressure to the work cylinders, makes it possible to design a lightweight tool of such mobility as substantially to increase the speed with which the tool may be moved into engagement with the work and withdrawn from the work, thereby very substantially shortening the operation of a cycle of operations. As here shown, the riveter or other press is connected with the power unit 14 through flexible hose lines 15 and 16, the former transmitting fluid for the advance or power stroke and the latter for the return stroke. It is essential to employ flexible lines of such character as to transmit the aforesaid high pressures without excessive expansion or distortion. High pressure hose of this character can be purchased on the open market. One satisfactory type comprises a reinforcing of woven wire wherein the strands run diagonally or spirally around the hose and are covered with a rubberized protective fabric. The inside of the hose is lined with a flexible leakproof composition. The wire reinforcing, while providing a flexible hose, is of such strength as to prevent undue expansion of the hose, thereby minimizing the volume of fluid (and therefore waste energy) consumed in expansion or stretching of portions of the apparatus under the high pressures developed.

The power unit 14 (see Fig. 2) for supplying the aforesaid pressures and for controlling the sequence of operations is illustrated diagrammatically in Fig. 1. This apparatus is claimed in our copending application, Serial No. 91,630, of which the present application is a division. The operation of said apparatus will be briefly described: Primary fluid pressure (in this instance oil pressure) is advantageously supplied by a rotary vane pump 17 driven by electric motor 18 and capable of supplying oil or other pressure fluid in substantial volume, up to approximately one thousand pounds per square inch. The pump inlet, and indeed the pump, is immersed in a reservoir of oil carried in the case 19 of the apparatus, the oil entering the pump through inlet pipe 20 and being discharged therefrom through pipe 21. Except for periods when the press is actually in operation, fluid delivered by the pump is short-circuited or returned to the reservoir at practically zero pressure. During such idle periods, the motor operates at practically no load.

Direct pressure from the pump serves to actuate the press piston 11 on its forward and return strokes and the pump is of such capacity as to deliver large volumes of fluid at pressures up to one thousand pounds per square inch, thereby insuring rapid forward movement of the press piston and closing of the press upon the work. For the squeezing or high pressure operation, such as the completion of the heading of a rivet which requires but a very short movement of the press plunger, the fluid pressure delivered to the work cylinder is intensified by an intensifier 23 represented by small and large pistons 24 and 25. During operation of the intensifier, fluid is delivered from the pump through pipe 26 to the face of the large piston 24 which has four to five times the area of the small piston. The latter acts on the fluid confined in its cylinder 27 and that in the hose line 15 and work cylinder 12 (being already under approximately one thousand pounds per square inch pressure) and because of the ratio of piston areas is capable of increasing the pressure of the fluid thus confined up to approximately five thousand pounds per square inch, such pressure being ample, and indeed somewhat in excess of that necessary, to complete the operation. The volume of cylinder 27 is made sufficient to not only complete the power stroke of the press but adequate to compensate for the stretching or expansion of the apparatus and hose lines under the very high pressures developed.

The power stroke in this instance is terminated by controlling means in the form of a pressure responsive device 28 (Fig. 1) which operates to direct pump pressure through pipe 29 and return line 16 to the opposite or return face of the work piston and to open the head end of the work cylinder 12 and the intensifier to discharge or exhaust. The return stroke is, in this instance, under the control of a pressure responsive device 30 which operates when a predetermined pump pressure is reached to effect neutralization of the system by connecting both the pump and the return line 29 with discharge, thereby dropping the pump pressure to substantially zero and relieving the load on the motor.

In the present apparatus, the pump is connected through pipe 21 and passage 31 in the valve block 32 with controlling means represented by a main or primary valve 33 whose function it is to control delivery of pressure fluid to the work cylinder for effecting the forward and return strokes of its piston and for terminating movement of the piston at any point in the cycle. The valve is here shown in the form of a double spool or piston valve controlling the passages 34 and 35 leading to exhaust, the passage 36 leading to the power side of the work cylinder, and the passage 37 leading to the return side of the work piston. Valve 33 is illustrated in full lines in its neutral position wherein the pump is short-circuited (discharging fluid to its reservoir) and both passages 36 and 37 leading to opposite faces of the work piston are open to discharge. In its lower position, wherein the central web 38 of the valve is indicated by dotted lines 39, the valve connects the pump to the passage 36 (leading to the head of the work cylinder) and fully opens the return passage 37 to discharge through passage 35. In its upper position, wherein the web 38 occupies the dotted line position 40, the pump is connected to the reverse passage 37 and the passage 36 is connected to discharge through passage 34. The webs at the upper and lower ends of the valve spool serve, of course, to close the valve bore against leakage.

The primary valve is in this instance controlled by solenoid 45 through mechanism, including the controlling devices 28 and 30, designed to permit the valve to be shifted to its extreme or reversing position, both when the solenoid remains energized and when it is de-energized, and to permit the inauguration of a new cycle (after the solenoid has been de-energized) at any point in the return stroke of the work piston. It is possible, therefore, to arrest and effect the immediate return of the work plunger at any point in its forward stroke as where the work is incorrectly placed or for any other reason, and to avoid the delay incident to a full return of the work piston if this be not required. The foregoing secondary operations of the primary valve are in this instance effected by relatively shifting the fulcrum points of the floating lever 47 which connects the primary valve stem 48 with the solenoid armature 46. The solenoid may be energized by any appropriate control circuit. The control switch should preferably be located at some convenient point with reference to the work cylinder, such, for example, as in the form of a push button switch 51, at the end of the handle 49 on the riveter where it may be conveniently pressed by the operator's thumb which is normally placed over the end of the handle in the use of the tool. Lines 52 may lead from the control switch or push button 51 to a transformer and relay switch (presently described) by means of which the solenoid 45 is energized.

When armature 46 is actuated, lever 47 operates through its fulcrum 53 to depress the primary valve to position 39. To effect movement of the valve to reverse position (i. e. position 40) the returning spring 67 is automatically pre-compressed to a degree greater than that for holding it in the neutral position illustrated in full lines in Fig. 1, by means here shown in the form of a cocking pin 68. The latter may be advantageously elevated by a small piston 69 subjected through passage 70 to primary fluid pressure, such pressure building up substantially immediately after operation of the primary valve. The cocking pin is pressed downwardly by a relatively weak spring 71. The cocking pin is held in its cocked or spring-compressing position by a latch 73 controlled by the pressure responsive device 30 which is actuated upon a predetermined back pressure to withdraw the latch and allow the cocking pin to return to its unlatched position (that illustrated in Fig. 1) to restore the spring 67 to the normal condition necessary for a return of the primary valve to neutral position at the end of the cycle of operations. Cocking pin 68 carries an arm 72 upon which the end of spring 67 seats and by which the spring is additionally pre-compressed upon elevation of the cocking pin. The latter is returned to its uncocked position by a weak spring 61.

The pressure responsive device 30 is here shown provided with a plunger 103 connected through passage 104 with the return pressure line 37. A pre-loaded spring 106 prevents elevation of plunger 103 until a predetermined back pressure has been reached. In the present instance such back pressure builds up when further return of piston 11 is prevented by its engagement of the cylinder head. The loading of spring 106 may be adjusted by a key 107 or in any other appropriate manner. Latch 73 is in this instance pressed toward the cocking pin by spring 74 and is withdrawn therefrom upon actuation of the pressure responsive device 30 by the cam surface 108 which engages the opposite end of latch 73. In this connection it will be understood that the pressure in the various passages, or more properly back pressure, is only what is necessary to overcome resistance to the movement of the work piston, and so long as such resistance increases, the pump pressure (and therefore the back pressure in such passages) will automatically increase until approximately the maximum pressure of which the pump is capable has been reached.

If solenoid 45 be de-energized at any point in the forward stroke of the work piston, spring 67 (having been additionally loaded by the cocking pin) will elevate the primary valve to its return position 40. Such return position is maintained until either the solenoid be re-energized or until the cocking pin be released upon the actuation of the pressure responsive device to return the primary valve to neutral position.

When the press plunger has advanced until it closes upon the work and has exerted such pressure on the work as may be developed from primary pump pressure, the intensifier is then caused to operate. In the present instance the intensifier is caused to operate upon a predetermined pressure which is approximately the maximum pump pressure which the pump may readily develop, in this case from 900 to 1000 pounds per square inch. The intensifier control device is here shown in the form of a pressure responsive valve 78 which connects the pump pressure with the intensifier through passage 26. A limited area of valve 78 is exposed to pump pressure from passage 82 whose orifice registers with a small bore 83 inside the valve and tends to move the valve upwardly. The lower portion of the bore is closed by pin 90. The intensifier valve is, in this instance, controlled by pre-loaded spring 86 whose plunger 80 is subjected to the pressures created in valve chamber 81 by plunger pin 79 on valve 78. Pressure is transmitted from the latter by the fluid confined in valve chamber 81. When a predetermined pump pressure is reached, spring 86 yields and valve 78 rises to connect the passages 36 and 26 by means of the passage 88 around the valve. At the same time, the lower end 92 of the valve cuts off discharge passage 93. Fluid pressure is thus delivered to the lower face of intensifier piston 24 causing its plunger 25 to intensify the pressure on the volume of oil confined in the intensifier cylinder 27 and the supply line as previously explained. Until the upper end of the plunger 25 cuts off passage 62 (which is connected with passage 36 by the annular passage 63 around the intensifier valve), cylinder 27 is in communication with the pressure passage 36. Therefore full pump pressure is maintained on the work cylinder and there is, therefore, no momentary drop in pressure in the work cylinder while the intensifier cylinder is being started in action. This prevents any removal of stretch or slack in the apparatus which would have to be restored by the intensifier cylinder before high pressure could be delivered to the work cylinder.

The control devices for the intensifier are so designed that the intensifier valve once having been opened remains open regardless of subsequent variations in pump pressure. It will be understood that immediately upon actuation of the intensifier valve the pump pressure temporarily very materially drops. This results from the fact that whereas the intensifier was placed in operation when a pump pressure of say one thousand pounds per square inch was reached, such a high pressure is not immediately required on the intensifier piston 25 to maintain the previous pressure upon the work piston since the intensifier piston 25 is several times larger in area (in this instance about five times) than that of the intensifier plunger 24. Therefore, there is a temporary drop in pump pressure to approximately 200 pounds per square inch, a pressure very much less than that which was necessary to elevate the intensifier valve. Means are, therefore, provided for preventing the intensifier valve from returning and developing the chattering action which would result from the ensuing repeated increases and reduction in line pressure. Such means are shown in the present instance in the form of the valve plunger 80 which allows the fluid in chamber 81 to escape through passage 87 to return line 37. The energy necessary to elevate valve 78 is thus dissipated by allowing the escape of the fluid and there is, therefore, nothing to cause the return of the valve so long as any pump pressure, however small, exists in line 36.

The loading on spring 86 is adjusted to allow the valve to open at the desired pump pressure.

The return cycle of the press plunger is in this case commenced when a predetermined intensifier pressure has been reached and at such predetermined pressure the control device 28 acts to effect the shifting of primary valve 33 to reverse position. When pressure thereupon develops in line 37, it is immediately transmitted through passage 87 and check valve 100 to plunger 79, thereby resulting in the immediate return of the intensifier valve to connect the intensifier cylinder to discharge. The spring 109 controlling valve 100 may be a relatively weak spring inasmuch as the function of valve 100 is simply to prevent escape of fluid into passage 87 until a predetermined pressure has been reached sufficient to operate valve 80.

Controlling device 28 is operated by intensified pressures in the intensifier cylinder 27 through pipe 96 which connects the intensifier cylinder with plunger 94 carried by the controlling device. The plunger is held down by a pre-loaded spring 97 whose pressure is adjusted so as to require the development of a predetermined intensified pressure before elevation of plunger 94 can occur. Adjustment in tension of the spring may be effected by the key 98 or in any other appropriate way. The primary valve is in this instance shifted to the aforesaid return position when the predetermined intensified pressure is reached by release of the fulcrum 53 of its controlling lever 47 to allow spring 67 to raise the valve to reverse position as previously described. Fulcrum 53 is in this instance carried upon a fulcrum pin 54 which is normally held against movement by a latch 57. The latter is released upon the movement of plunger 94 by a cam surface 99 on control device 28 which acts on a transverse pin 58 carried by the latch to withdraw it from its seat 59. Normally the latch is pressed toward fulcrum pin 95 by spring 61. Fulcrum pin 54 is normally pressed downward into position to be engaged by latch 57 by spring 97. Such spring is advantageously made light so as not to interpose any substantial resistance to the operation of spring 67 in elevating primary valve to reverse position. In this connection it will be noted that the latter valve is thus operated regardless of whether or not solenoid 45 is energized inasmuch as fulcrum 53 is then free to be raised to such position as may be necessary under the action of spring 54.

When the work piston reaches the end of its return stroke, its resistance to further movement causes a rising of back pressure in return line 37 which is communicated to passage 104 and results in the elevation of plunger 103 and the control device 30 when the predetermined back pressure (depending upon the pre-loading of spring 106) has been reached. This results in the release of cocking pin 68 and its return to uncocked position as shown in Fig. 1. Lowering of the seat 72 upon which spring 67 rests automatically results in the lowering of primary valve 33 to neutral position. As soon as the pressure in intensifier cylinder 27 has been reduced, control device 28 returns to normal position, releasing latch 57 and (providing the operator has released the push button to de-energize solenoid 45 and permit the lowering of the fulcrum pin 54) re-latching of the pin and its fulcrum 53 in lowered or operating position. If the operator does not de-energize solenoid 45 during the return stroke of the work piston, fulcrum pin 54 cannot be returned and latched in operating position and the primary valve, therefore, cannot be operated to start a new cycle but will be returned and will remain in neutral position. It is, therefore, necessary in order to repeat the cycle of operations for the operator deliberately to de-energize solenoid 45. A new cycle cannot be accidentally started through inattention of the operator. Once de-energized, fulcrum pin 54 is immediately reset. Thereupon if solenoid 45 be re-energized even at any point in the return stroke of the work piston, the primary valve will be immediately shifted to forward position and a new cycle will be started without waiting for the work piston to return to the end of its stroke. This greatly increases the speed with which riveting and other operations may be performed since a new cycle may be started as soon as the press plunger has released the headed rivet and has been placed in operative relation to another rivet.

A safety valve 113 is advantageously provided to protect the pump against excessive pump pressures which may be developed through improper adjustment of the pre-loaded control springs or otherwise. Such valve controls a short-circuiting passage 114 which leads from the pump line 31 and returns the pump fluid to the reservoir through passage 116. Valve spring 117 is, therefore, loaded so as to permit release of the valve before excessive pressures are reached. Such loading should be great enough, however, to prevent the valve from opening under pump pressures required for normal operation of the apparatus.

The very high pressures thus made available for completion of the operation permit a very substantial reduction in size of the press piston and cylinder 11 and 12, thereby not only making it possible to cold head rivets, punch, etc., with a small lightweight tool, but to attain a very much higher speed of operation since much smaller volumes of oil need be moved.

The increase in speed and mobility of the tool becomes more apparent when contrasted with the type of tool which would be required if low pump pressures not exceeding one thousand pounds per square inch were employed. In such case, to deliver the same force as the present apparatus, a press piston five times larger in area would be required. This would involve the delivery of five times as much oil and would require not only five times as long to advance the tool on the work but five times as long to return it. The weight and size of such a tool would be so great as to render it practically immobile and incapable of reaching the less accessible parts of the work. Indeed, it would practically become a stationary press, requiring the work to be moved in the tool and not vice versa as with the present apparatus.

The speed of operation is in nowise reduced because of the development of very high pressures at the conclusion of the operation since the latter involve only the minute final movement of the tool 13 and therefore only a very small volume of oil. Moreover the intensifier is placed in operation only at the instant it is required (and not before) and then without previous relaxation of the pressures on the tool. There is, therefore, no opportunity for removal of slack and stretch in the apparatus. At other stages of the operation only direct and low pump pressures are required and small low horse power pumps are available for thus advancing the tool to the work and returning it at any desired speed.

The ability to stop the tool at any point on its return stroke (i. e. as soon as it has cleared the work) and to start it on a new cycle contributes materially to the speed with which successive operations can be performed. It is generally the practice to provide a flexible overhead suspension for the tool which counterbalances most of its weight, thereby greatly increasing the freedom and speed with which the operation can move and position the tool.

For punching and other operations, appropriate change is, of course, required in the dies employed. Like riveting, these operations require rapid advance and return of the tool to and from the work and application of final high pressure (involving only a minute movement of the tool) only to complete the operation.

Obviously the invention is not limited to the precise apparatus for supplying pressure thereto nor to the details of the tool itself since these may be variously modified. Moreover, it is not indispensable that all features of the invention be used conjointly since various features may be used to advantage in different combinations and sub-combinations.

Having described our invention, we claim:

1. Apparatus for cold heading rivets at high speed comprising in combination a lightweight riveting yoke having an operating cylinder, a pump for delivering large volumes of liquid to said cylinder to advance the same quickly on the rivet, a flexible pressure line capable of withstanding pressures in excess of 2500 pounds per square inch connecting said pump and said cylinder to permit said yoke to be moved rapidly from rivet to rivet, said pump being constructed and arranged to deliver sufficient pressure to remove slack and to stretch said flexible line, and means operative when substantial resistance is encountered in heading the rivet for delivering intensified pressures in excess of 2500 pounds per square inch to said cylinder of such magnitude as to cold head the rivet, said means being constructed and arranged to operate without releasing the slack and stretch in said line.

2. Apparatus for cold heading rivets and performing other pressure operations comprising in combination a lightweight mobile press yoke having a cylinder of relatively small diameter for operating the tool, a pump for delivering large volumes of liquid directly to said cylinder to advance the tool quickly on the work, the pressure supplied directly by said pump being inadequate to complete the operation of said cylinder, a flexible pressure line connecting said pump with said cylinder and adapted to permit the yoke to be moved readily from place to place, said flexible line being capable of withstanding pressures in excess of 2500 pounds per square inch, and means operative when the resistance to further advance of the tool approximates the limit of direct pump pressure for intensifying the pressure supplied to said cylinder through said flexible line to complete the operation of said cylinder, said intensified pressure not exceeding the carrying limits of said flexible line.

3. Apparatus for cold heading rivets and performing other operations requiring high pressure comprising in combination a lightweight mobile yoke having a relatively small cylinder carrying an operating tool, a pump for delivering large volumes of liquid directly to said cylinder to advance the tool quickly on the work, the diameter of said cylinder being substantially less than that necessary for completing its operation under direct pump pressure, a flexible pressure line connecting said pump with said cylinder and adapted to permit the yoke to be moved readily from place to place, said flexible line being capable of withstanding pressures of at least 2500 pounds per square inch without substantial stretching, and means for supplying intensified pressure through said flexible line to said cylinder to complete its operation, said means being operative when resistance approximating the limit of direct pump pressure is encountered by the tool to supply said intensified pressure without releasing the pressure in said line.

VICTOR W. PETERSON.
OTTO J. MAHA.